United States Patent [19]

Hirose

[11] 4,371,297

[45] Feb. 1, 1983

[54] MACHINE TOOL

[75] Inventor: Noboru Hirose, Nagoya, Japan

[73] Assignee: Brother Kogyo Kabushiki Kaisha, Aichi, Japan

[21] Appl. No.: 190,069

[22] Filed: Sep. 23, 1980

[30] Foreign Application Priority Data

Oct. 3, 1979 [JP] Japan .......................... 54-136849[U]

[51] Int. Cl.³ .................. B23B 45/04; B23B 47/22; F15B 5/00
[52] U.S. Cl. ........................... 408/130; 92/81; 92/82
[58] Field of Search ............... 408/130; 92/81, 82, 92/85 B, 86.5; 91/209, 235

[56] References Cited

U.S. PATENT DOCUMENTS

| | | | |
|---|---|---|---|
| 2,811,877 | 11/1957 | Groff | 408/130 |
| 2,854,870 | 10/1958 | Chaffee et al. | 408/130 |
| 3,141,509 | 7/1964 | Bent | 408/130 |
| 3,598,497 | 9/1969 | Nyman | 408/130 |
| 4,111,590 | 10/1976 | Burkart et al. | 408/130 |

Primary Examiner—William R. Briggs
Assistant Examiner—Paul M. Heyrama, Sr.

Attorney, Agent, or Firm—Browdy and Neimark

[57] ABSTRACT

The machine tool provided with a machine frame adapted to be attachable to a stand, a pneumatic cylinder for reciprocating a quill on the machine frame, and a feed control device for controlling the forward moving speed of the quill comprising a hydraulic cylinder which is parallelly disposed to the quill and includes a piston assembly having a projecting portion engageable with the quill and a liquid tank. The quill is moved, until it is engaged with the projecting portion in the forward moving thereof, at a rapid feed speed and after the engagement at a controlled feed speed by the feed control device. The liquid tank has a pair of openings arranged such that either one of the two may constantly come under the liquid surface in the tank no matter in what posture the machine frame may be attached to the stand. The feed control device comprises a connecting device including two passages respectively communicated with each of the two openings and a joining device for selectively joining one of the two passages which is in communication with one of the pair of openings situated under the liquid surface with a cylinder chamber of the hydraulic cylinder.

4 Claims, 6 Drawing Figures

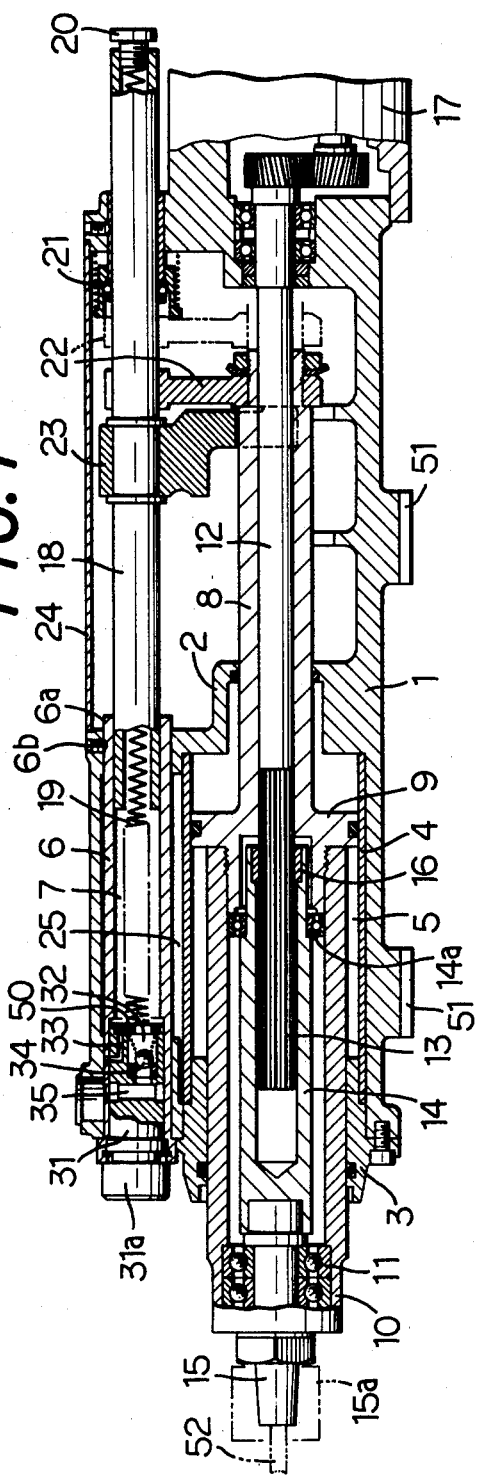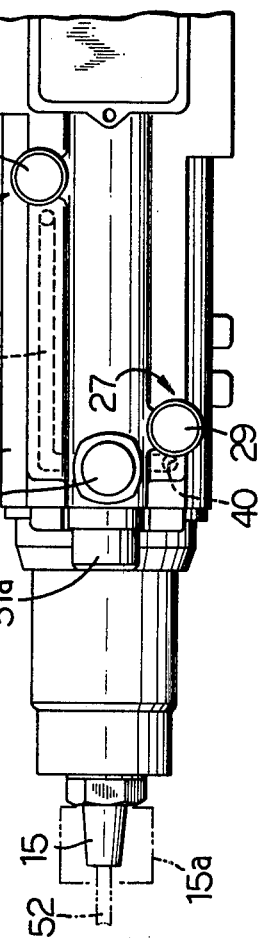

MACHINE TOOL

BACKGROUND OF THE INVENTION

This invention relates to a machine tool wherein a tool is moved first at a rapid feed speed to slightly short of a work-to-be-processed, and thereafter is moved at a suitable process feed speed. More particularly, the invention relates to a machine tool provided with a machine frame adapted attachable to a stand, a pneumatic cylinder for reciprocating a quill on the machine frame, and feed control means, for controlling the moving speed of the quill, comprising a hydraulic cylinder which is disposed in parallel to a quill and includes a piston assembly having a projecting portion engageable with the quill and a liquid tank, whereby the machine is under a rapid feed speed until the quill is engaged with the projecting portion and thereafter under a controlled feed speed by the feed control means.

In machine tools of this kind, attaching of the machine frame to the stand has been required now and then to be varied in some ways in respect to the reciprocating direction of the quill according to the shape of the work.

In those machine tools, however, a liquid tank is installed on the machine frame, which tank communicates with a cylinder chamber of the hydraulic cylinder through an opening formed in the tank by way of suitable flow amount regulating means. They are subjected therefore to a problem that the opening formed in the tank must by all means be positioned under the liquid surface of the tank, otherwise air in the tank may be sucked into the hydraulic cylinder chamber by chance, which can paralyze the feed speed control function of the hydraulic cylinder to the quill.

Those conventional machine tools are placed under a strict condition that they should be attached to a stand such that the opening of the tank is positioned beneath the liquid surface, which disadvantageously restricts their use or way of employment.

SUMMARY OF THE INVENTION

It is an object of this invention to provide a machine tool which has eliminated the disadvantage of the prior art by being under no restricting conditions in respect to the posture of attaching it.

A preferred embodiment of a machine tool in accordance with this invention is provided with a machine frame to be attached to a stand, a pneumatic cylinder for reciprocating a quill on the machine frame, and a feed control means, for controlling the forward moving speed of the quill, comprising a hydraulic cylinder which is disposed in parallel to the quill and includes a piston assembly having a projecting portion engageable with the quill and a liquid tank. The liquid tank is provided with two openings, either one of the two openings being so arranged as to under the liquid surface in the tank irrespective of any posture the machine frame takes to the stand, that is, no matter in what posture the machine frame is attached to the stand. Furthermore, the feed control means is provided with a connecting means including two passages communicated with each of the two openings in the tank, and means for selectively joining a passage, which is communicated with one opening of the two situated under the liquid surface in the tank, with a cylinder chamber of the hydraulic cylinder.

In this embodiment, after the quill has in a forward motion engaged with the projecting portion of the piston assembly the liquid in the hydraulic cylinder chamber will be discharged into the liquid tank through the opening under the liquid surface thereof by way of regulating means and the selected passage, and when the projecting portion of the piston assembly is after the finishing of one process retracted the liquid in the tank is supplied into the hydraulic cylinder chamber through the opening under the liquid surface in the tank by way of the selected passage and the regulating means. Incidentally, the regulating means regulates flow of liquid from the liquid cylinder to the liquid tank while allowing free flow of the liquid from the liquid tank to the liquid cylinder.

The two openings in the liquid tank may be suitably switched to and from each other such that one opening of two situated under the liquid surface may be communicated with the hydraulic cylinder chamber in accordance with each attached posture of the machine frame to the stand whenever it is changed.

This invention has effectively succeeded in eliminating the conventional restriction in respect to the attaching posture or operating direction of the machine tool.

BRIEF DESCRIPTION OF THE DRAWINGS

FIG. 1 is an axial section of an embodiment of a machine tool in accordance with this invention;

FIG. 2 is a partial plan view of the embodiment of FIG. 1;

DETAILED DESCRIPTION OF THE PREFERRED EMBODIMENT

Figure 3:
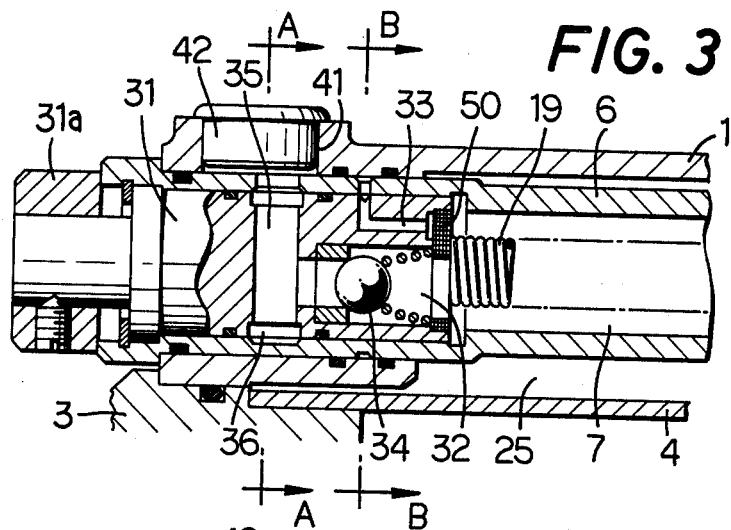
FIG. 3 is an enlarged axial section of an oil-passage-forming member which is situated at the forward end of a hydraulic cylinder.

A machine frame 1 of the machine tool is made into an elongated body with a pair of attaching legs or flanges 51 on the outside thereof; the front end of the machine frame 1 is sealed air tightly by a transversely disposed partition wall 2 and an end plate 3. On the internal side of the partition wall 2 and the end plate 3 either end of a cylinder tube 4 is respectively fixed; another cylinder tube 6 is oil-tightly and rotatably retained by the partition wall 2 and the end plate 3 lying parallel to the cylinder tube 4, piercing through the both members (2, 3). A hollow piston rod 8 is air-tightly and slidably piercing through the partition wall 2 as far as to project into the cylinder tube 4 for having on the tip thereof a piston 9. A quill 10 is fitted on the end projection of the piston 9 and projects at the forward end portion thereof from the end plate 3 air-tightly as well as slidably. The hollow piston rod 8, the piston 9 and the quill 10 constitute a quill assembly. The quill assembly and a housing consisting of the cylinder tube 4, the partition wall 2 and the end plate 3 constitute a pneumatic cylinder 5. Inside the outwardly projected portion of the quill 10 a bearing 11 is installed. A drive shaft 12 is rotatably inserted concentrically with, and from the backward end of, the hollow piston rod 8 and has at the forward end thereof a spline portion 13. A spindle 14 is loosely fitted inside the forward portion of the hollow piston rod 8 and the quill, being rotatably supported by radial bearing 14a. The spindle 14 is carried at the forward end portion thereof by the bearing 11 and has a tapered shaft 15 fixed on the tip thereof. The spline portion 13 of the drive shaft 12 is loosely inserted into a deep center bore formed in the backward and central portion of the spindle 14 to slidably engaged with an internal spline member 16 secured in the center bore of the spindle 14. The drive shaft 12 is rotated in one direction by a motor 17.

The forward end of the cylinder tube 6 which is parallel to the drive shaft 12 rotatably and oil-tightly receives an oil-passage-forming member 31 with a knob 31a on the forward end thereof. A slightly projected portion of the cylinder tube 6 backwardly from the partition wall 2 consitutes a rotational switching operation portion 6a. Numeral 6b designates a set screw for fixing the cylinder tube 6. Into the cylinder tube 6 a hollow ram 18, wherein a piston portion and a rod portion are integrally formed into one pipe body, is inserted. The cylinder tube 6, the hollow ram 18, and the oil-passage-forming member 31 constitute an hydraulic cylinder 7. The backward end portion of the hollow ram 18 is pierced through a one-way clutch 21 which is disposed on the machine frame 1; a coil spring 19 is disposed concentrically in the central space of the hollow ram 18, abutting at the forward end thereof on an oil filter 50 which is attached on the inside end surface of the oil-passage-forming member 31 and retained at the backward end by a plug 20 fixed to the hollow ram 18. A control arm 22 is secured on the backward end of the hollow piston rod 8 so that a yoke shaped portion thereof may straddle the hollow ram 18; and an engaging arm 23 is secured, at the forward side of the control arm 22, on the hollow ram 18 so that a yoke shaped portion thereof may straddle the hollow piston rod 8. A removable cover 24 is attached for covering an opening formed on the top or upper side of the machine frame 1 (in FIG. 1) ranging from the position corresponding to the partition wall 2 to that aligned with the one-way clutch 21.

The one-way clutch 21 freely allows forward motion of the hollow ram 18 while prohibiting the backward movement thereof and is constructed such that when the hollow piston rod 8 is retracted to the original or start position thereof, after the hollow ram 18, the hollow piston rod 8, etc., have once reached a given preset forwardmost motion limit, it allows the hollow ram 18 to be retracted, because of the neutralization of the clutch due to the action of the control arm 22, to the original position owing to the action of the coil spring 19.

The cylinder tube 4 of the pneumatic cylinder 5, the cylinder tube 6 of the hydraulic cylinder 7 and the machine frame 1 form, with the aid of the partition wall 2 and the end plate 3, an oil tank 25 confining an oil storage chamber 25a therein. On either side of the cylinder tube 6 in the machine frame 1 a pair of oil supply ports 26, 27 for the oil tank 25 are formed, one being forwardly and the other backwardly as shown in FIG. 2 positioned in the longitudinal direction of the cylinder tube 6. Each of the supply ports 26, 27 is respectively covered by a screw cap 28, 29; either one of the screw caps 28, 29 is provided with a ring packing 30.

Figure 4:
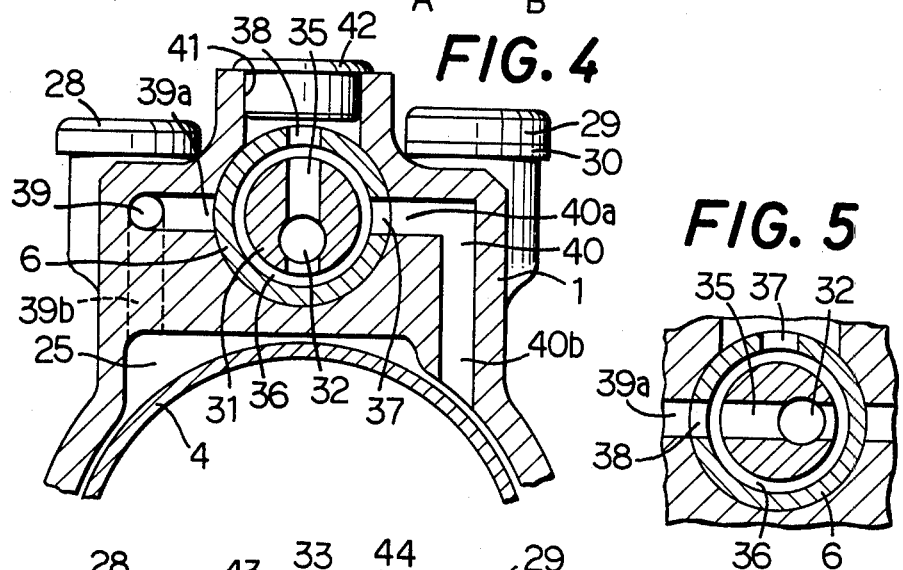
FIG. 4 is a cross sectional view of the oil-passage-forming member in FIG. 3 taken along the section line A—A.

The oil-passage-forming member 31 constitutes a forward end wall for the hydraulic cylinder 7, and has an oil suction passage 32 and an oil discharge passage 33 formed in the internal end thereof as illustrated in FIG. 3. Inside the oil suction passage 32 a check valve 34 wherein a ball is urged by a spring into a valve seat is installed. The farthest end of the oil suction passage 32 is connected or communicated with an oil flow hole 35 bored in the radial direction of the oil-passage-forming member 31 as shown in FIG. 4. The both ends of the oil flow hole 35 are communicated with an annular groove 36 formed on the oil-passage-forming member 31. A pair of radial through-bores 37, 38 are formed in the cylinder tube 6 with an angular distance of 90° to be constantly communicated with the annular groove 36. Numerals 39 and 40 respectively designate a connecting passage having a portion formed perpendicular to the cylinder tube 6 with a respective opening 39a, 40a, the former being formed in the machine frame 1 so as to be opened to the oil storage chamber 25a in the vicinity of the backwardly located oil supply port 26 and the latter being disposed in the machine frame 1 so as to be opened to the oil storage chamber 25a in the vicinity of the forwardly located oil supply port 27. Numeral 41 designates an opening for checking the oil, being in a communicated state with one of the through-bores 37, 38 which are communicated with neither of the connecting passages 39, 40. Opening 41 is fitted with a cap 42 of transparent resin or like material.

Figure 6:
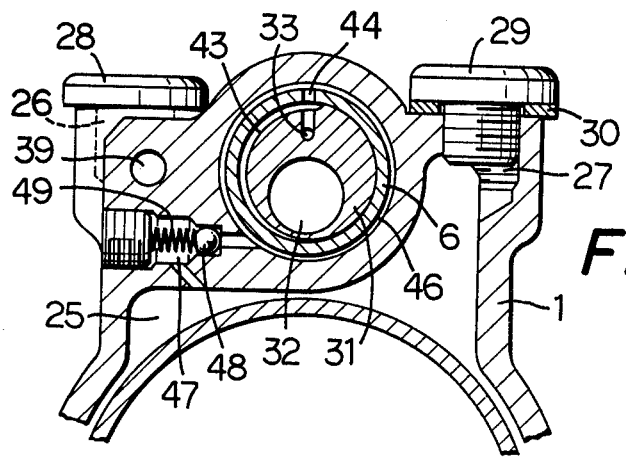
FIG. 6 is a cross sectional view of the oil-passage-forming member in FIG. 3 taken along the section line B—B.

The oil discharge passage 33 is communicated with a throttle valve groove 43a of semi-circular shape formed circumferentially on the external periphery of the oil-passage-forming member 31 with a gradually varied depth (see FIG. 6). The throttle valve groove 43a communicates with a fine bore 44 formed in the cylinder tube 6. The outer end of the fine bore 44 communicates with a circumferential groove 46, which is in turn communicated to the oil tank 25 by way of a communication passage 47 containing a ball 48 and a compression spring 49 therein. The cylinder tube 6 and the oil-passage-forming member 31 constitute a throttle valve 43 whose degree of opening is adjustable by rotating the oil-passage-forming member 31 with the knob 31a thereof.

In operating the machine tool the drive shaft 12 is driven by energization of the motor 17 and air is supplied into the pneumatic cylinder 5 through a directional control valve so as to forwardly push the piston 9 for moving the hollow piston rod 8 in the same direction, while a tool (drill) 52 attached to the tapered shaft 15 via a chuck 15a is rotated. The hollow piston rod 8 is advanced from the original position shown in FIG. 1 with a two-dot-chain line to a position shown with a solid line where the control arm 22 is abutted on the engaging arm 23 to move the tool 52 at a rapid feed speed, i.e., the speed of the piston 9. After the engagement of the control arm 22 with the engaging arm 23 the tool 52 is given a processing feed speed under the regulation of the resistance applied on the hollow ram 18, which slides according to the oil discharge capacity of the throttle valve 43. When the tool 52 has finished a required forward movement a sensing signal signifying that position of the tool 52 will command the directional control valve to supply air into the pneumatic cylinder 5 for moving the piston 9 at a rapid speed back to the original position. The returning of the piston 9 thereto acompanied by the hollow piston rod 8 and the control arm 22 neutralize the one-way clutch 21 as earlier mentioned, with a result of allowing the hollow ram 18 to return to the original position shown in FIG. 1 owing to the elastic force of the coil spring 19. At this moment the oil in the oil tank 25 is sucked into the hydraulic cylinder 7 via the oil suction passage 32.

In the machine tool exemplified above the tool 52 is required to be reciprocated in various directions and angles, for instance, horizontal, slant upward, right upward, slant downward, right downward, etc. The machine frame 1 is required to be employable at any desired posture or from any desired angle. This necessitates that the connecting passage to the hydraulic cylinder 7 must be constantly opened and under the oil surface in the oil tank 25 by all means, because if the air above the oil surface in the oil tank 25 were sucked by chance into the hydraulic cylinder 7, processing feed control of the tool 52 under the regulation of the hydraulic power would be deteriorated or nullified.

Figure 5:
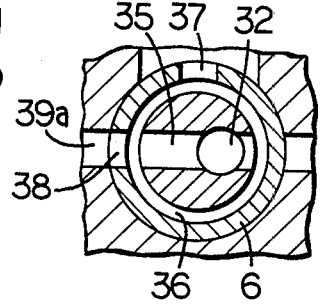
FIG. 5 is an explanatory view of a part of FIG. 4 for showing a switch-over of communication.

This embodiment is very convenient to be suitably adjusted according to the direction of its employment. For example, when the tool 52 is used positioned slant downward or right downward the cylinder tube 6 is rotated, after removing the cover 24, with a rotational switching operation portion 6a such that the through-bore 37 is registered with the opening 40a of the connecting passage 40 whose opening to the oil storage chamber 25a is positioned lower in relation to the other as shown in FIG. 4, and the through-bore 38 is communicated with the opening 41 for checking the oil. When the tool 52 is used positioned slant upward or right upward the through-bore 38 is registered with the opening 39a of the connecting passage 39 whose opening to the oil storage chamber 25a is positioned lower in relation to the other as shown in FIG. 5, rendering the through-bore 37 to be communicated with the opening 41 for checking the oil. When the tool 51 is used positioned horizontally either way of communication illustrated in FIG. 4 and FIG. 5 will do. As to the through-bores 37, 38 either one may be sufficient for the purpose.

Due to the above-mentioned switching over either one of the pair of connecting passages 39, 40 opened under the oil surface in the oil tank 25 is selected, which surely prevents the air above the oil surface from being sucked into the hydraulic cylinder 7.

As either one of the oil supply port 26, 27 comes constantly lower than the other, the ring packing 30 should be applied only to one of the oil supply ports 26, 27 at to lower side, by taking it off the other of the oil supply ports 26, 27 for the purpose of letting the atmospheric air get into the oil tank 25 through a slight gap between the screw cap 28 or 29 and the oil supply port 26 or 27.

What is claimed is:
1. A machine tool having:
    a machine frame adapted to be attached to a stand,
    a quill reciprocably mounted on the machine frame,
    a spindle rotatably mounted in the quill and carrying a tool at one end thereof,
    a motor operatively connected with the spindle for rotating the same,
    pneumatic feed means for reciprocating the quill in advancing and returning directions, and
    feed control means for controlling the feed speed of the quill, including:
        (a) an hydraulic cylinder which is disposed in parallel with the quill and provided with a housing confining a cylinder chamber therein and a piston assembly disposed within the housing having a portion projecting from one end of the housing,
        (b) a liquid tank formed on the machine frame, along the axis of the spindle,
        (c) means for connecting the liquid tank to the hydraulic cylinder,
        (d) regulating means disposed in the connecting means for regulating flow of liquid from the hydraulic cylinder to the liquid tank and allowing free flow of the liquid from the liquid tank to the hydraulic cylinder, and
        (e) engaging means for engaging the quill with the projecting portion of the piston assembly when the quill arrives at a desired position in the forward movement thereof, whereby the quill is moved at a rapid speed by the pneumatic feed means until it engages with the projecting portion and then is moved at a slow speed controlled by the regulating means,
    wherein the improvement comprises;
        the connecting means including two passages, each having at one end thereof a first opening associated with the liquid tank, and at the other end thereof a second opening associated with the cylinder chamber, one of the first openings of the passages being open to one axial end portion of the liquid tank, and the other of the first openings being open to the other axial end portion of said liquid tank,
        selecting means for selectively communicating the cylinder chamber with one of the second openings of the passages and blocking the other of the second openings, whereby the selection of either one of the two second openings causes the liquid tank to be communicated with the cylinder chamber via one of the first openings corresponding to the selected second opening, thereby enabling the machine tool to be used in any posture with at least one of the first openings maintained below the surface of liquid in the tank.

2. A machine tool according to claim 1, wherein the pneumatic feed means comprises a pneumatic cylinder having
    a cylinder tube mounted on the machine frame for accommodating the quill therein, and
    a piston portion fixed to the quill.

3. A machine tool according to claim 2, wherein the liquid tank is constructed by utilizing the cylinder tube of the pneumatic cylinder and the machine frame as members for confining a liquid storage chamber therein.

4. A machine tool according to claim 3, wherein the selecting means comprises:
    the housing of the hydraulic cylinder which is constituted of a tubular member having a radial through-bore communicated with the hydraulic cylinder chamber through the regulating means and mounted on the machine frame rotatably between two rotation positions;
    means for fixing the tubular member at one of the two rotation positions; and
    each of the second openings of the two passages being arranged on an internal surface of a bore formed in the machine frame for rotatably supporting the tubular member such that either one of the second openings is registered with the radial through-bore when the tubular member is rotated to one of the two rotation positions.

* * * * *